United States Patent

[11] 3,599,292

[72] Inventors Isidoro Ronzoni
  Camerlata;
  Mario Miani, Rho, both of, Italy
[21] Appl. No. 743,794
[22] Filed July 10, 1968
[45] Patented Aug. 17, 1971
[73] Assignee Montecatini Edison S.p.A.
[32] Priority July 17, 1967
[33] Italy
[31] 18,475

[54] EQUIPMENT FOR THE INJECTION MOLDING OF THERMOPLASTIC MATERIALS HAVING A HIGH CONTENT OF VOLATILE SUBSTANCES
2 Claims, 6 Drawing Figs.

[52] U.S. Cl. .................................................. 18/30 SM,
  18/12 SN, 18/DIG. 4
[51] Int. Cl. ..................................................... B29f 1/00
[50] Field of Search ............................................ 18/12 SN,
  12 SS, 30 SM, DIG. 4, DIG. 62

[56] References Cited
UNITED STATES PATENTS

| | | | |
|---|---|---|---|
| 1,478,842 | 12/1923 | Staley | 264/102 |
| 2,378,539 | 6/1945 | Dawihl | 18/12 X |
| 3,151,192 | 9/1945 | Jacobs et al. | 18/12 X |
| 3,164,563 | 1/1965 | Maxwell et al. | 18/12 X |

Primary Examiner—H. A. Kilby, Jr.
Attorney—Stevens, Davis, Miller & Mosher

ABSTRACT: Equipment is provided for the injection molding of thermoplastic materials containing high quantities of volatile substances which is of the type having a degassing zone constituted by the reduction at some point along the diameter of the core of the pressing screw, in registration with a vent hole adjacent the cylinder in which said screw moves. The particular improvement here involved is characterized by the provision, in combination with said degassing zone and preferably at a location immediately on the inlet side of the degassing zone itself, of a device shaped like a spinneret constituted by at least a plate provided with holes connected with the screw shaft and suitable for causing a high pressure on the thermoplastic material on the inlet side of said degassing zone and for increasing the surface of the thermoplastic material being subjected to said degassing. In addition, at least one part of the length of the cylinder containing said pressing screw is provided with a wide countersink or ovalization suitable for facilitating the advancing of the thermoplastic material through the equipment. Moreover, the said cylinder, starting from an end adjacent said vent-hole, is provided with a flared zone suitable to further facilitate the injection-molding operation.

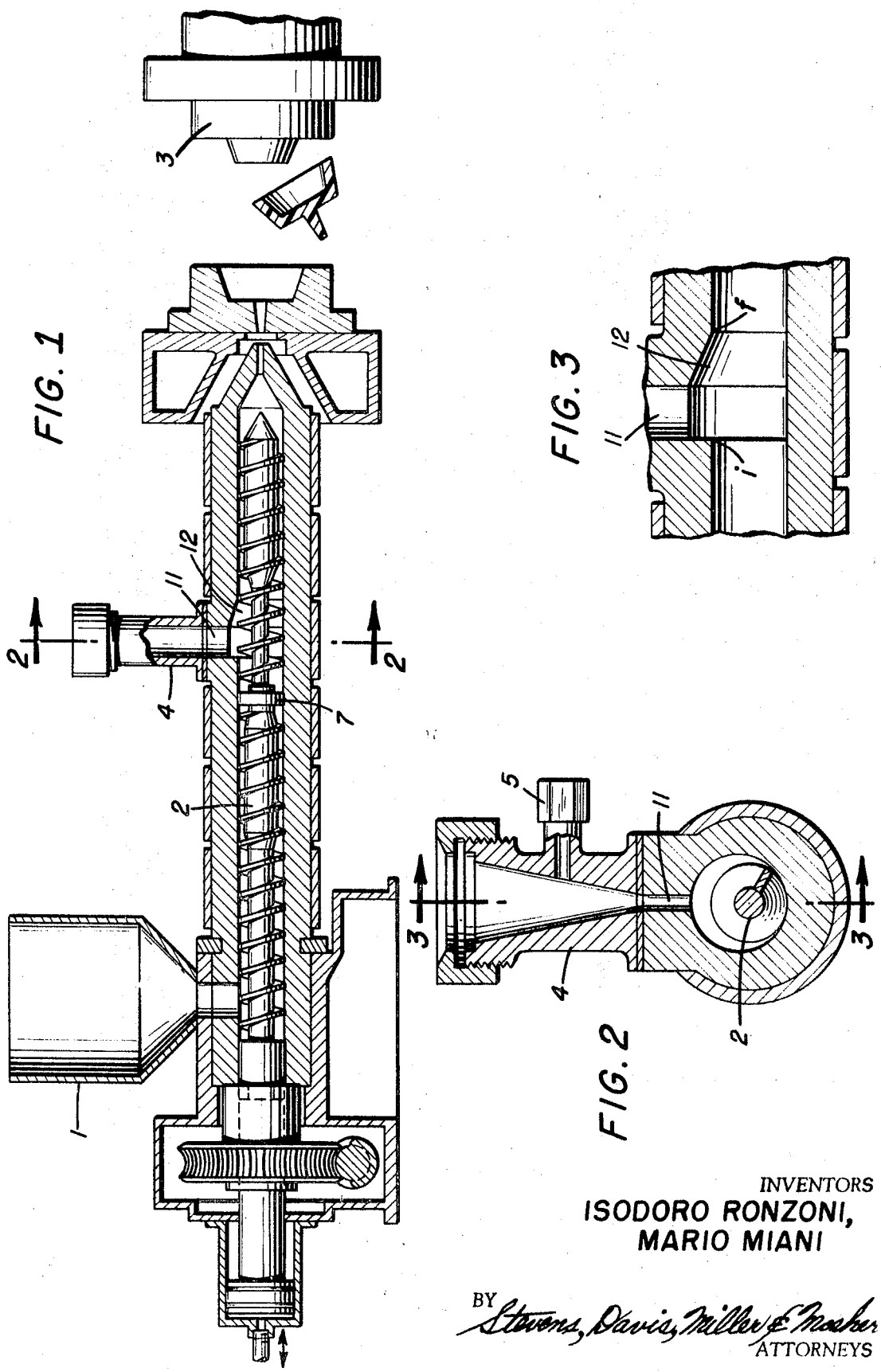
INVENTORS
ISODORO RONZONI,
MARIO MIANI

INVENTORS
ISODORO RONZONI,
MARIO MIANI

BY Stevens, Davis, Miller & Mosher
ATTORNEYS

EQUIPMENT FOR THE INJECTION MOLDING OF THERMOPLASTIC MATERIALS HAVING A HIGH CONTENT OF VOLATILE SUBSTANCES

It is well known that most of the thermoplastic resins used for injection-molding contain, in consequence of their process of manufacture, traces of monomers and solvents, and more often, residual moisture and/or moisture absorbed during storage. At the molding temperature, these substances are converted into the gaseous state, thus causing in the hand-manufactured goods the formation of more or less accentuated bubbles or streakings which detract from the desirable characteristics of the plastic material and from the aesthetic appeal of the manufactured plastic article.

In order to eliminate these drawbacks the thermoplastic material, before the utilization, is subjected to a strong drying which is quite burdensome for economic and technological reasons. In fact the thermoplastic material may require a stay for some hours in drying equipment, such as ovens having divisions with appropriate air circulation, infrared rays ovens, etc. Furthermore, the drying operation requires particular care to guard against pollution dangers, such as for example the presence of dust, granules of different color or different material, etc. which can make the manufactured plastic article not acceptable owing to poor homogeneity, poor aesthetic appeal, etc.

The present invention relates to equipment for carrying out the injection molding of thermoplastic materials without employing preheating even when the thermoplastic material contains high quantities of volatile substances. In particular, it relates to an injection press provided with a cylinder with a punching screw or with a piston cylinder with a screw preplasticizer or, more generally, to a press with one or more screws of a special construction such as renders this press suitable for the molding of all thermoplastic materials having a high content of volatile substances, such as for example methacrylic and styrene homopolymers and copolymers, ABS polymers, polyamides, polycarbonates, polyvinyl chloride and other vinylic polymers, polyvinyl acetal, cellulosic resins, etc.

According to the present invention, the polymers, without any previous drying, are processed in any shape they may appear such as granules, pearls, dusts, etc.

The equipment according to the present invention uses a degassing device which has as its object eliminating completely, during the molding operation, the volatile substances contained in the thermoplastic material undergoing treatment.

This degassing device resides in the provision of a suitable opening in the cylinder for the escape of the gaseous products and in a screw with a special profile; usually said degassing opening is coupled with suitable suction equipment whereas the screw of the equipment or press is provided with a special zone, a "degassing zone," having the diameter of the core less than that of one of the other zones. Said special zone is for the purpose of permitting the plastified resin to expand and therefore of releasing the gaseous products without any danger of escape of the thermoplastic material in the plastic state.

Therefore, the object of the present invention is that of providing an injection equipment or press of the type using a degassing zone as above described, and further provided with means for facilitating remarkably the escape of the gaseous products and above all such as to avoid, during the injection-molding stage, the return of the plastic material to the degassing zone and its consequent release from the vent opening of the cylinder.

This object is attained by an equipment or press for the injection molding of thermoplastic materials containing high quantities of volatile substances, in which the equipment uses a degassing system of the broadly known type constituted by the reduction of the diameter of the core of the screw having a profile variable in correspondence with a vent-hole provided in the cylinder; said equipment including in combination with said degassing zone and in particular in the zone immediately at the inlet side of the degassing zone, a device substantially like a spinneret constituted by at least a perforated plate fixedly connected with the core of the screw and being such as to cause a high pressure in the thermoplastic material on the inlet side of the degassing zone and being such as to increase the surface of the thermoplastic material subjected to the degassing.

The equipment which is the object of the present invention is shown in the accompanying drawings, which represent one embodiment of the present invention without however limiting it to that particular embodiment:

FIG. 1 shows the equipment in longitudinal axial section (in the position of ejection of the molded article with the maximum moving backward of the injection screw);

FIG. 2 shows a cross section in the degassing zone along the line 2-2 of FIG. 1;

FIG. 3 shows a cross section along the axis of the cylinder along the line 3-3 of FIG. 2;

Figure 4:
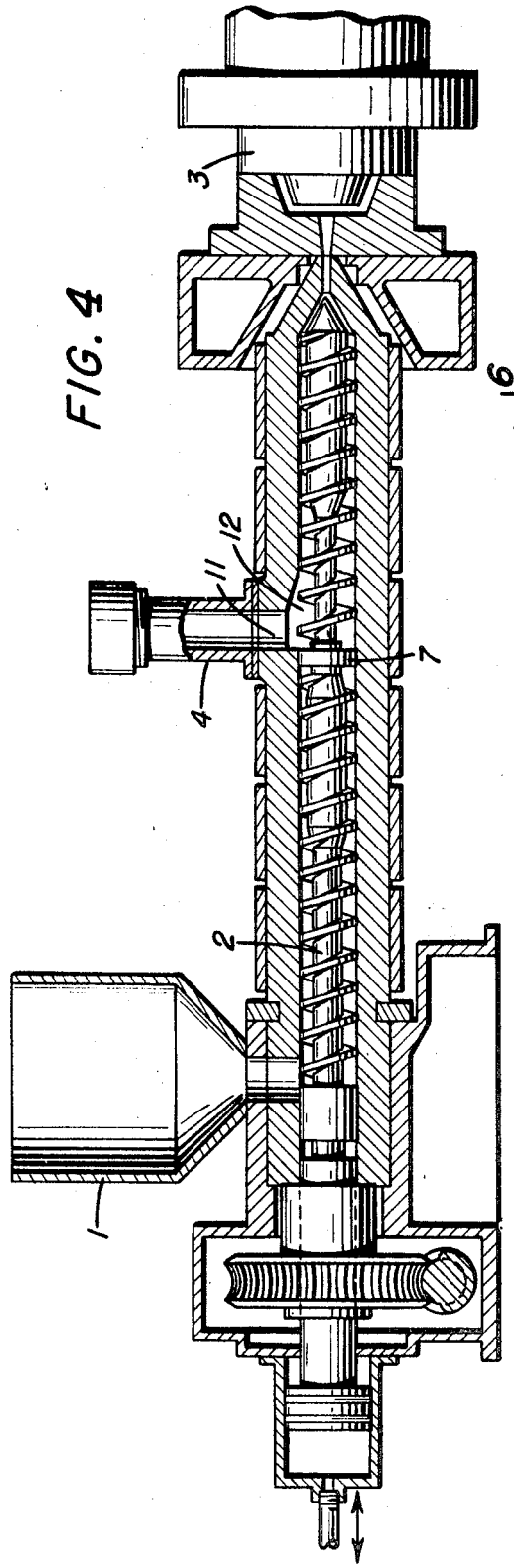
FIG. 4 shows the equipment in longitudinal axial section (in the position of starting of charging or maximum advancing of the injection screw)

In the drawings there are not represented in detail the parts which are well known per se and which do not concern the present invention, such as, for example, heating means, transmission unit for rotational movement of the screw, hydraulic means for axial movement of the screw, means for opening and closing the mold, etc.

In order better to understand the functional effectiveness of the so-called spinneret device, it is preferable first of all to explain how a degassing zone of the broadly known type is structurally constituted and how the pressing screw press works by way of general background.

Figure 5:
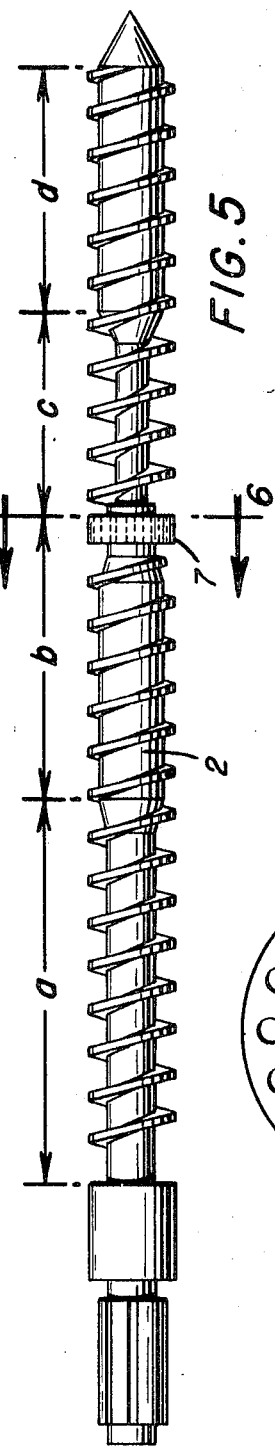
FIG. 5 shows the profile of the injection screw and so-called "spinneret"

With reference to the accompanying figures, and in particular FIGS. 1 and 4, the unit with which the spinneret device is associated works like the usual cylinders for screw injection presses. Thus, the thermoplastic material is conveyed from the feed hopper 1 by means of the movement of the screw 2 towards the opposed end of the cylinder. During this run the thermoplastic material reaches the degree of plasticity sufficient for injection into the mold 3. The pressing screw 2, with respect to the working of the thermoplastic material, has a variable profile and may be divided theoretically into four zones (FIG. 5), respectively indicated by $a, b, c, d$.

The zone $a$, or feeding zone, has the function of feeding the thermoplastic material in the solid state to the subsequent zones; in the last part of this zone the thermoplastic material starts to receive heat from the outside such as from a conventional steam- or electrically heated jacket.

The zone $b$, or plasticization zone, has the task of plasticizing the thermoplastic material and of compensating its variations in volume resulting from melting, by means of the decrease of the free space existing between two consecutive screw threads and the inner surface of the cylinder, that is by means of the increase of the diameter of the core.

The zone $c$ is the zone where the degassing takes place; the resin arrives at this zone already completely plasticized and the gases contained therein free themselves almost instantaneously owing to the rapid decompression resulting from the increase in free space due to the decrease in diameter of the core.

In registration with this zone $c$ the cylinder is provided with an opening which may communicate through a suitable pipe 4 with a condenser 5 (see FIG. 2) and the suction part of a vacuum pump (not shown).

In consequence of the suction created in zone $c$, there results the removal of the gaseous products contained in the polymer. It is to be noted that in the event of a low value of volatile substances the degassing may be carried out without the vacuum pump although normally that is preferred.

The length in pitches of the degassing zone, i.e., of the region of reduction of the diameter of the core, must be greater, and preferably at least four pitches, than the diameter of the degassing hole on the cylinder since in order to assure the complete degassing of the product and to avoid the escape of the material during the periods of injection and of charging, the following conditions have to be observed as a practical matter:

when the punching or plastics advancing screw is in the position of starting of charging; that is, in the position of maximum advancing, the side $i$ (FIG. 3) of the opening must be situated at least one pitch after the beginning of the zone $c$ of the screw or degassing zone;

when the punching or plastics advancing screw is in the position of end of charging; that is, in the position of maximum moving backward, the side $f$ (FIG. 3) of the opening must be situated at least one pitch before the beginning of the zone $d$ of the screw or homogenization zone.

The zone $d$, or homogenization zone, has the function of compressing again the melted and degassed polymer and to convey it to the extreme right end of the cylinder or batching chamber in the wanted quantity, to carry out the injection-molding operation.

Figure 6:
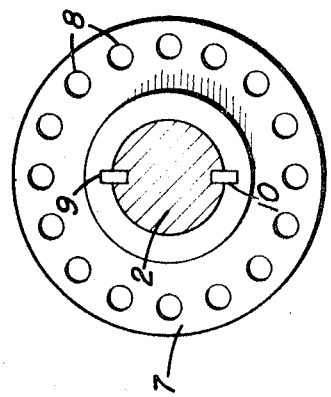
FIG. 6 shows the so-called "spinneret" looking along the line 6-6 of FIG. 5.

In practice it is noted that by the degassing system described above it is not possible to avoid the return of the thermoplastic material from the zone $d$ (at the moment of the injection period) to the degassing zone and its consequent escape from the suction pipe 4. Therefore in order to solve this serious drawback, according to the present invention, a device shaped like a spinneret (see FIG. 6) is provided which is constituted by a circular plate 7, perforated by a series of holes 8 and keyed fixedly on the shaft of the screw 2 by keys 9 and 10. The so-called spinneret is placed immediately on the inlet side of the degassing zone $c$ as shown in FIG. 4, and it has a diameter which is substantially equal to that of the screw thread.

The cross section and the number of the holes in the circular plate 7 must be such as to assure at the beginning of the degassing zone a pressure higher than that existing at the end of the zone $d$ in the injection or charging period. The holes 8 are preferably but not necessarily circular, and they are as numerous as possible without endangering the mechanical strength of the spinneret itself. Two or more rows of holes may be employed.

By this circular plate or spinneret device it is possible to attain the double advantage of increasing the surface of the thermoplastic material exposed to the degassing (since the drawn thermoplastic material presents an overall surface greater than the one which the corresponding cylinder would bring about if the spinneret were not present) and of permitting an increase in the diameter of the shaft of the screw in the zone $d$.

Finally, in the case of the injection molding of very swellable thermoplastic materials, in the absence of said spinneret there would be in the degassing region a considerable swelling of the thermoplastic material with an increasing tendency for it to escape from the suction pipe 4. The presence of said spinneret plate insures that this drawback will not occur.

The cross sections shown in FIGS. 2 and 3 show details of the degassing opening 11 leading to the suction pipe 4 and of the flared zone 12 of the cylinder near said degassing opening 11. In these figures it is possible to see the substantially enlarged bore of the cylinder where it communicates with the degassing opening 11, thus assuring the regular advancing of the thermoplastic material along the screw without escaping from the degassing hole.

The marked advantages that may be attained by the equipment of the present invention, in contrast to injection presses without degassing and without said spinneret device now used in the molding of the thermoplastic polymers, are:

1. the possibility of using thermoplastic materials with a high moisture content, thus avoiding predrying;

2. elimination of monomers, solvents and volatile substances dissolved in the resin, thus enabling one to use directly thermoplastic polymers coming from the polymerization equipment, by avoiding the operation of granulation and degassing now carried out with extrusion equipment;

3. elimination of casual or inadvertent contamination of the resin in the drying equipment;

4. high quality of the molded products which are now free of inhomogeneities, streakings, etc.

It is evident that the foregoing advantages are of pronounced economic utility.

The following examples are given in order still better to show the advantages of the present invention, although they are not intended to be limiting. All percentages are by weight.

Example 1

Polymethylmethacrylate in the form of granules containing 2.5 percent of volatile substances is dried for 6 hours in an air circulation oven at 80°C. A material is obtained having a content in humidity of 0.25 percent. A conventional injection press of the normal type, lacking a degassing zone, is then fed with 100 g. of this dried polymethylmethacrylate and a small basin is molded having dimensions of 120×200×3 mm. The molding conditions are the following:

| | |
|---|---|
| temperature from the feed zone to the nozzle, °C. | 170–190–210–210 |
| injection pressure, kg./cm.$^2$ | 1,200 |
| cycle, sec. | 40 |

Shaped articles of polymethylmethacrylate are obtained absolutely lacking in defects which thus serve as the standard for evaluating the molded articles obtained according to the present invention.

Example 2

An injection press of the horizontal type, equipped with a screw cylinder 45 mm. in diameter and provided with a degassing device and spinneret plate according to the present invention, is fed with 100 g. of polymethylmethacrylate in granules, containing 2.5 percent of volatile substances, for the molding of a small basin having dimensions of 120×200×3 mm. The molding conditions are the following:

| | |
|---|---|
| temperature from the feed zone to the nozzle, °C. (in the zones $a, b, c, d$ and at the nozzle) | 170–190–210–190–210 |
| injection pressure, kg./cm.$^2$ | 1200 |
| cycle, sec. | 40 |
| residual pressure at the degassing opening, mm./Hg | 50 to 60 |

Shaped articles of polymethylmethacrylate are obtained which are absolutely lacking in defects and are equal in quality to the articles of example 1, and therefore are fully in conformity with what is required for their practical utilization.

Example 3

A conventional injection press of the normal type, without degassing zone, is fed with 100 g. of polymethylmethacrylate, in the form of granules containing 2.5 percent of volatile substances, for the molding of a small basin having dimensions of 120×200×3 mm. Unlike example 1, no previous drying is carried out. The operative conditions are the following:

| | |
|---|---|
| temperature from the feed zone to the nozzle, °C. | 170–190–210–210 |
| injection pressure, kg./cm.$^2$ | 1200 |
| cycle, sec. | 40 |

Shaped articles are obtained which, when compared with the standard ones of example 1, present a poor aspect owing to the presence of superficial streakings oriented according to the flow of the thermoplastic material, as well as bubbles giving a spongy aspect.

Example 4

An injection press of the horizontal type equipped with a screw cylinder having a diameter of 45 mm., and provided with a degassing device and spinneret plate according to the present invention, is fed with 100 g. of polymethylmethacrylate in the form of nondried pearls having 2.5 percent of volatile substances, for the molding of a small basin having dimensions of 120×200×3 mm. The molding conditions are the following:

| | |
|---|---|
| temperature from the feed zone to the nozzle, °C. (in the zones a, b, c, d and at the nozzle) | 170–190–210–190–210 |
| injection pressure, kg./cm.² | 1200 |
| cycle, sec. | 40 |
| residual pressure at the degassing opening, mm./Hg | 50 to 60 |

Transparent shaped articles without any defects are obtained.

Shaped articles of the same nondried thermoplastic material molded on a screw injection press, but without a degassing system, are absolutely unacceptable because of the irregularity of feeding and because of the presence of streakings and bubbles in the molded articles.

5

An injection press of the horizontal type equipped with a screw cylinder having a diameter of 45 mm., and provided with a degassing device and spinneret plate according to the present invention, is fed with 60 g. of ABS polymer in the form of granules having 1.6 percent of volatile substances, for the molding of a glass having dimensions of 100×60×3 mm. The molding conditions are the following:

| | |
|---|---|
| temperature from the feed zone to the nozzle, °C. (in the zones a, b, c, d and at the nozzle) | 160–180–200–190–200 |
| injection pressure, kg./cm.² | 1,300 |
| cycle, sec. | 30 |
| residual pressure at the degassing opening, mm./Hg | 50 to 60 |

Shaped articles are obtained having a shining surface and free of defects. Shaped articles of the same nondried thermoplastic material, but molded on a screw injection press without any degassing system, are wholly unacceptable due to the presence of several streakings and superficial flakes.

Example 6

Under otherwise the same conditions as example 4 water is added the the feeding hopper to the extent of a total moisture content for the thermoplastic material of from 10 to 20 percent by weight.

Transparent shaped articles are obtained which are lacking in any defects, despite this deliberate addition of a substantial amount of moisture to the starting material.

Example 7

An injection press of the horizontal type equipped with a screw cylinder having a diameter of 45 mm., and provided with a degassing device and spinneret plate according to the present invention, is fed with 55 g. of polypropylene in the form of granules having 1.5 percent of volatile substances, for the molding of a glass having dimensions of 100×60×3 mm. The molding conditions are the following:

| | |
|---|---|
| temperature from the feeding zone to the nozzle, °C. (in the zones a, b, c, d and at the nozzle) | 180–190–210–190–210 |
| injection pressure, kg./cm.² | 1,300 |
| cycle, sec. | 30 |
| residual pressure at the degassing opening, mm./Hg | 760 |

Shaped articles are obtained having a shining surface and free from defects.

Shaped articles of the same nondried material, but molded on an injection screw press without a degassing system, present a defective appearance including streakings and superficial flakes.

We claim:

1. An injection-molding apparatus for the preparation of articles from thermoplastic materials containing volatile substances comprising a screw in a cylinder and having a degassing zone, said degassing zone having
   i. an inlet zone;
   ii. a suction pipe attached to said cylinder in said degassing zone near said inlet; and
   iii. an outlet the improvement comprising providing a plate containing holes immediately prior to said suction pipe, said plate being affixed to the screw core of said injection-molding apparatus and wherein the diameter of said screw in said degassing zone is reduced by at least two pitches relative to the diameter outside said degassing zone, and wherein the internal cavity of said inlet zone is a cylinder flared toward the cavity containing the screw, in order to avoid the escape of material from said suction pipe and to facilitate the injection molding operation.

2. An injection-molding apparatus according to claim 1, in which said plate is a circular plate having a diameter equal to that of the screw threads.